(12) United States Patent
Alobaidi et al.

(10) Patent No.: US 11,866,081 B2
(45) Date of Patent: Jan. 9, 2024

(54) MOBILE BATTERY POWERED BEVERAGE DISTRIBUTION CART

(71) Applicant: Green Cubes Technology, LLC, Kokomo, IN (US)

(72) Inventors: Mohammed Alobaidi, Kokomo, IN (US); Calvin Ting, Kokomo, IN (US); Goo Sung, Kokomo, IN (US)

(73) Assignee: Green Cubes Technology, LLC, Kokomo, IN (US)

( * ) Notice: Subject to any disclaimer, the term of this patent is extended or adjusted under 35 U.S.C. 154(b) by 163 days.

(21) Appl. No.: 17/433,198

(22) PCT Filed: Feb. 21, 2020

(86) PCT No.: PCT/US2020/019203
§ 371 (c)(1),
(2) Date: Aug. 23, 2021

(87) PCT Pub. No.: WO2020/172521
PCT Pub. Date: Aug. 27, 2020

(65) Prior Publication Data
US 2022/0135097 A1    May 5, 2022

Related U.S. Application Data

(60) Provisional application No. 62/808,767, filed on Feb. 21, 2019.

(51) Int. Cl.
*B62B 3/00* (2006.01)
*B67D 1/08* (2006.01)

(52) U.S. Cl.
CPC ............ *B62B 3/005* (2013.01); *B67D 1/0857* (2013.01); *B67D 1/0888* (2013.01); *B67D 1/0891* (2013.01)

(58) Field of Classification Search
CPC ...... F25D 11/00; F25D 2400/38; F25D 23/12; B62B 3/005; B62B 2202/023;
(Continued)

(56) References Cited

U.S. PATENT DOCUMENTS 5,915,602 A * 6/1999 Nelson ...................... A47F 9/00
108/143
6,012,790 A * 1/2000 Thomas ................ E04H 1/1222
312/265.5
(Continued)

FOREIGN PATENT DOCUMENTS

EP   2 759 990 A1   7/2014

OTHER PUBLICATIONS

International Searching Authority, International Search Report, PCT/US20/19203, dated Jul. 28, 2020.
(Continued)

*Primary Examiner* — Lien M Ngo
(74) *Attorney, Agent, or Firm* — Reichel Stohry Dean LLP; Mark C. Reichel; Natalie J. Dean

(57) ABSTRACT

Disclosed herein are various mobile battery powered beverage distribution and marketing carts, kiosks, systems, and methods for operating, transporting, charging, maintaining, optimizing, and storing these mobile battery powered beverage distribution and marketing carts. The mobile battery powered beverage carts may generally comprise a wheeled base, upper workstation, at least one storage and/or refrigerated compartment, a battery, and a large viewing screen for displaying marketing and/or entertainment content thereon. The battery within the cart is configured to operate any electrical componentry on the cart, so that the cart can be independently operable away from any electrical wall outlets. These carts can be customized with any number of options or accessories to meet particular demands and be
(Continued)

temporarily deployed to areas where demand, or crowd size, is highest.

20 Claims, 2 Drawing Sheets

(58) Field of Classification Search
CPC .. B62B 2204/04; B67D 1/0857; B67D 1/088; B67D 1/0891; B67D 2210/00089; B67D 2210/00133; F25B 27/00
USPC .................................... 222/1, 146.6, 129.1
See application file for complete search history.

(56) References Cited

U.S. PATENT DOCUMENTS

| | | | | |
|---|---|---|---|---|
| 6,918,258 | B2 * | 7/2005 | Cunha | A23G 9/228 |
| | | | | 62/342 |
| 8,584,900 | B2 * | 11/2013 | Metropulos | B67D 1/0041 |
| | | | | 222/145.5 |
| 9,039,016 | B2 * | 5/2015 | Abernethy | F16M 11/18 |
| | | | | 361/679.01 |
| 9,145,067 | B1 * | 9/2015 | Dahlen | G01S 19/16 |
| 2002/0195467 | A1 * | 12/2002 | Meder | E04B 1/344 |
| | | | | 222/146.6 |
| 2007/0215239 | A1 * | 9/2007 | Dorney | G06Q 20/342 |
| | | | | 222/146.2 |
| 2008/0141702 | A1 | 6/2008 | Gagliano et al. | |
| 2011/0017776 | A1 | 1/2011 | Metropulos et al. | |
| 2011/0168775 | A1 * | 7/2011 | Van Zetten | B67D 1/0888 |
| | | | | 222/129 |
| 2014/0209634 | A1 * | 7/2014 | Metropulos | B67D 1/0041 |
| | | | | 222/608 |
| 2014/0299630 | A1 * | 10/2014 | Brown | B67D 1/06 |
| | | | | 222/144.5 |
| 2014/0372233 | A1 * | 12/2014 | Knecht | B67D 1/0888 |
| | | | | 705/15 |
| 2016/0214789 | A1 | 7/2016 | Stumpf | |
| 2016/0257553 | A1 * | 9/2016 | Banus Ricoma | B67D 1/10 |
| 2017/0360243 | A1 * | 12/2017 | Crowne | A23L 2/54 |
| 2019/0047839 | A1 * | 2/2019 | Giarratano | B67D 1/0857 |

OTHER PUBLICATIONS

International Searching Authority, Written Opinion of the International Searching Authority, PCT/US20/19203, dated Jul. 28, 2020.

* cited by examiner

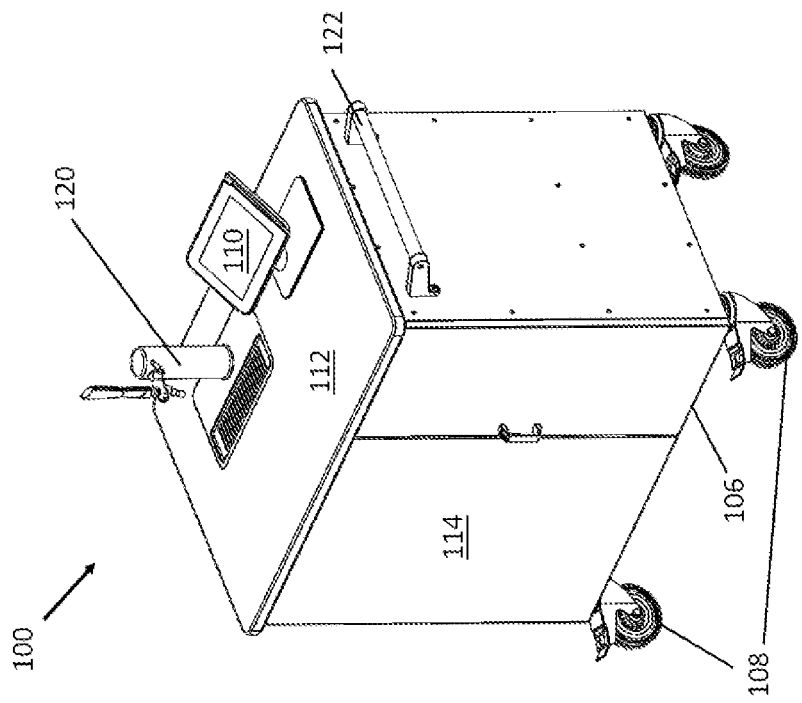
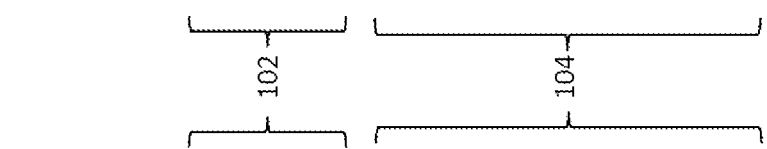
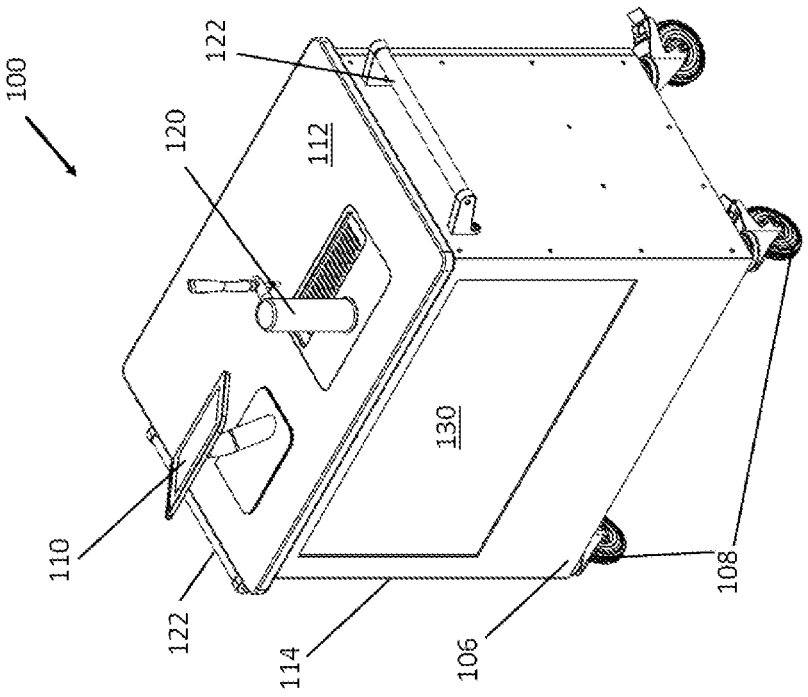

MOBILE BATTERY POWERED BEVERAGE DISTRIBUTION CART

PRIORITY

The present application is related to, and claims the priority benefit of, U.S. Provisional Patent Application Ser. No. 62/808,767, filed Feb. 21, 2019, the contents of which are incorporated herein directly and by reference in their entirety.

BACKGROUND

Today, there are coffee shops on almost every corner, some malls even have more than 3 coffee shops within a one block area (or less). The availability and convenience of picking up a beverage quickly has become the new norm, and very good for the beverage businesses. Other coffee shops have recognized this and have created drive-thru coffee stands in parking lots, which have become increasingly successful and profitable over the past decade. With real estate costs on the rise, brick and mortar coffee shop options may not be feasible or financially possible, thus a mobile battery powered beverage distribution and marketing cart would be desirable.

The ability to pack all of the necessities of a beverage shop (bar, coffee shop, soda fountain, etc.) into a mobile beverage cart allows retailers to sell their product on the go. The battery power of the beverage cart may provide the electrical power to run the electrical componentry thereon, such as: a refrigerator (or cooler), freezer, ice maker, espresso machines, milk steamers, coffee bean grinder(s), speakers, viewing or display screens, or even a television (for the beverage menu, sports/event streaming, or marketing purposes). By being mobile, beverage vendors could move around stadiums or arenas to high-volume areas to alleviate congestion. The beverage vendors could be mobilized at festivals, or concerts in large fields where power supply is limited, or through parking lots prior to sports events, where people are tailgating. Additionally, beverage vendors could also move throughout conventions or exhibits to help appease attendees. The possibilities for use of these mobile battery powered beverage distribution carts are endless.

Additionally, these mobile battery powered beverage distribution carts could be used to test new products, market existing products, give out free samples, or simply to generate significant revenue. Removing the need for a permanent shop or retail establishment greatly increases marketability of such a cart and in turn, increases revenue potential. Thus, there exists a need for mobile battery powered beverage distribution carts.

BRIEF SUMMARY OF THE INVENTION

The present disclosure includes disclosure of a mobile battery powered beverage distribution cart, comprising: a wheeled base portion having at least one refrigerated compartment therein for storing and refrigerating beverages; an upper workstation coupled to the wheeled base portion and having at least one beverage distribution dispenser thereon operatively coupled to the at least one refrigerated compartment for dispensing beverages therefrom; at least one large viewing screen for marketing or entertainment; at least one battery secured within the cart and electrically coupled to the at least one refrigerated compartment, the at least one beverage distribution dispenser, or the at least one large viewing screen, to provide electrical power thereto; and wherein the cart is configured to be easily maneuverable by rolling to different locations for beverage distribution.

The present disclosure also includes disclosure of the mobile battery powered beverage distribution cart, further comprising an interactive touch screen or computer disposed on the upper workstation of the cart and having Wi-Fi or other wireless communication capability; wherein the interactive touch screen or computer processes beverage orders and payments.

The present disclosure also includes disclosure of the mobile battery powered beverage distribution cart, further comprising security features to securely lock the interactive touch screen or computer, wheeled base, at least one battery compartment, or at least one refrigerated compartment, to prevent theft or unauthorized tampering.

The present disclosure also includes disclosure of the mobile battery powered beverage distribution cart, wherein the interactive touch screen or computer is securely mounted to the upper workstation of the cart.

The present disclosure also includes disclosure of the mobile battery powered beverage distribution cart, wherein the interactive touch screen or computer is removably mounted to the upper workstation of the cart.

The present disclosure also includes disclosure of the mobile battery powered beverage distribution cart, wherein the interactive touch screen or computer comprises its own separate battery pack.

The present disclosure also includes disclosure of the mobile battery powered beverage distribution cart, wherein the interactive touch screen or computer further comprises Wi-Fi, and wherein the interactive touch screen or computer communicates with a central computer, via the Wi-Fi, to provide cart status information.

The present disclosure also includes disclosure of the mobile battery powered beverage distribution cart, wherein content of the at least one large viewing screen is programmed by the central computer.

The present disclosure also includes disclosure of the mobile battery powered beverage distribution cart, wherein the at least one large viewing screen further comprises Wi-Fi.

The present disclosure also includes disclosure of the mobile battery powered beverage distribution cart, wherein the wheeled base portion further comprises a storage compartment for beverage making supplies and accessories.

The present disclosure also includes disclosure of the mobile battery powered beverage distribution cart, further configurable to maintain wireless communications with a central computer or processor to monitor and optimize operations.

The present disclosure also includes disclosure of the mobile battery powered beverage distribution cart, further comprising at least one handle for pushing and/or maneuvering the cart to the different locations.

The present disclosure also includes disclosure of the mobile battery powered beverage distribution cart, further configured for storing, refrigerating, and selling food items.

The present disclosure also includes disclosure of the mobile battery powered beverage distribution cart, further comprising at least one of: coffee and/or espresso machines, beverage warming surfaces, milk steamers, coffee bean grinder, refrigerator, freezer, cooler, kegerator(s), carbonation machine(s), mixers, blenders, ice maker/distributor, and other electric dispensers or taps.

The present disclosure also includes disclosure of the mobile battery powered beverage distribution cart, further comprising at least one of: GPS, Bluetooth, Wi-Fi, a camera, a printer, a credit card reader, and/or a money slot and/or change dispenser.

The present disclosure also includes disclosure of the mobile battery powered beverage distribution cart, wherein the at least one battery is rechargeable and is not removable.

The present disclosure also includes disclosure of the mobile battery powered beverage distribution cart, wherein the at least one battery is removable for recharging.

The present disclosure also includes disclosure of the mobile battery powered beverage distribution cart, wherein the at least one battery provides sufficient electrical power to operate the cart without needing to plug the cart into an electrical wall outlet.

The present disclosure also includes disclosure of the mobile battery powered beverage distribution cart, wherein the at least one battery provides enough electrical power to operate the cart without electrically hardwiring, or tethering, the cart to another electrical source.

The present disclosure also includes disclosure of the mobile battery powered beverage distribution cart, wherein the at least one battery can be charged when adjacent, and coupled to, another mobile battery powered beverage distribution cart, via a daisy chain.

The present disclosure also includes disclosure of the mobile battery powered beverage distribution cart, further comprising a low-powered, low-frequency Bluetooth beacon for tracking and positioning the cart to maintain cart fleet awareness and location.

The present disclosure also includes disclosure of the mobile battery powered beverage distribution cart, wherein the at least one large viewing screen is mounted above the upper workstation for optimal viewing by a large crowd of people.

The present disclosure also includes disclosure of the mobile battery powered beverage distribution cart, wherein the at least one large viewing screen is mounted on a side of the wheeled base portion.

The present disclosure also includes disclosure of the mobile battery powered beverage distribution cart, further configured to maintain and optimize performance by monitoring, at least: beverage supply, beverage quantity remaining, battery power charge level, supply level of beverage accessories, operating efficiency, content of the at least one large viewing screen, status of electrical componentry, malfunctions, employee requests, help needed, supplies needed, financial data, sales data, customer numbers, security, temperature data, and battery charge level of any electrical componentry.

The present disclosure includes disclosure of a mobile battery powered beverage distribution cart, comprising: a wheeled base portion having at least one refrigerated compartment therein for storing and refrigerating beverages; an upper workstation coupled to the wheeled base portion for preparing and dispensing beverages; a computer disposed on the upper workstation for processing beverage orders and payments; at least one battery secured within the cart and electrically coupled to the at least one refrigerated compartment or the computer, to provide electrical power thereto; and wherein the mobile battery powered distribution cart is configured to be easily maneuverable by rolling to different locations.

The present disclosure also includes disclosure of the mobile battery powered beverage distribution cart, wherein the cart further comprises at least one of: coffee and/or espresso machines, beverage warming surfaces, milk steamers, coffee bean grinder, refrigerator, freezer, cooler, kegerator(s), carbonation machine(s), mixers, blenders, ice maker/distributor, and other electric dispensers or taps.

The present disclosure also includes disclosure of the mobile battery powered beverage distribution cart, wherein the computer comprises its own separate battery pack.

The present disclosure also includes disclosure of the mobile battery powered beverage distribution cart, wherein the computer further comprises Wi-Fi, and wherein the computer communicates with a central computer or processor, via the Wi-Fi, to provide cart status information.

The present disclosure also includes disclosure of the mobile battery powered beverage distribution cart, further comprising at least one viewing screen; wherein content of the at least one viewing screen is programmed by the central computer or the processor.

The present disclosure also includes disclosure of the mobile battery powered beverage distribution cart, further comprising at least one viewing screen.

The present disclosure also includes disclosure of the mobile battery powered beverage distribution cart, wherein the at least one viewing screen further comprises Wi-Fi.

The present disclosure includes disclosure of a system for maintaining and optimizing performance of mobile battery powered beverage distribution carts, comprising: at least one mobile battery powered beverage distribution cart, comprising: a wheeled base portion having at least one refrigerated compartment therein for storing and refrigerating beverages; an upper workstation coupled to the wheeled base portion for preparing and dispensing beverages; a computer disposed on the upper workstation for processing beverage orders and payments; at least one battery secured within the cart and electrically coupled to the at least one refrigerated compartment or the computer, to provide electrical power thereto; and wherein the mobile battery powered distribution cart is configured to be easily maneuverable; and a central computer in wireless communication with the computer of the at least one mobile battery powered beverage distribution cart, wherein the central computer can track status of the at least one mobile battery powered beverage distribution cart to maintain and optimize performance.

The present disclosure also includes disclosure of the system, wherein the at least one mobile battery powered beverage distribution cart further comprises GPS or a tracking beacon to communicate location data to the central computer.

The present disclosure also includes disclosure of the system, wherein the at least one mobile battery powered beverage distribution cart further comprises at least one viewing screen thereon.

The present disclosure also includes disclosure of the system, wherein the computer of the at least one mobile battery powered beverage distribution carts communicates wirelessly with the at least one viewing screen to control content of the at least one viewing screen.

The present disclosure also includes disclosure of the system, wherein maintaining and optimizing performance of the at least one mobile battery powered beverage distribution carts comprises: beverage supply, beverage quantity remaining, battery power charge level, supply level of beverage accessories, operating efficiency, content of the at least one large viewing screen, status of electrical componentry, malfunctions, employee requests, help needed, supplies needed, financial data, sales data, customer numbers, security, temperature data, and battery charge level of any electrical componentry.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein:

FIG. 2A illustrates a perspective view of a second embodiment of a mobile battery powered beverage distribution cart; and FIG. 2B illustrates another perspective view of the second embodiment of the mobile battery powered beverage distribution cart of FIG. 2A.

Figure 1B:
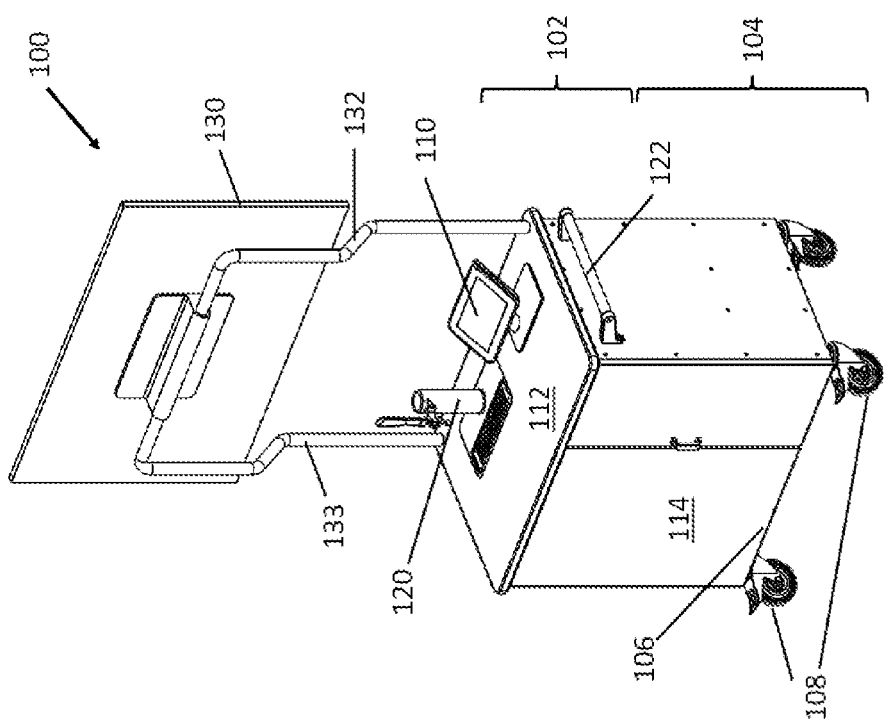
FIG. 1B illustrates another perspective view of the first embodiment of the mobile battery powered beverage distribution cart of FIG. 1A.

As such, an overview of the features, functions and/or configurations of the components depicted in the various figures will now be presented. It should be appreciated that not all of the features of the components of the figures are necessarily described and some of these non-discussed features (as well as discussed features) are inherent from the figures themselves. Other non-discussed features may be inherent in component geometry and/or configuration. Furthermore, wherever feasible and convenient, like reference numerals are used in the figures and the description to refer to the same or like parts or steps. The figures are in a simplified form and not to precise scale.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present disclosure includes various mobile battery powered beverage distribution and marketing carts, kiosks, systems, and methods for operating, transporting, charging, maintaining, optimizing, monitoring, and storing these mobile battery powered beverage distribution and marketing carts. These mobile battery powered beverage and marketing carts may generally comprise any combination of at least the following features/accessories: a computer, a tablet, a phone, a point of sales machine, interactive touchscreen, camera, handle(s), base portion, battery or onboard power supply, printer, credit card reader, wireless fidelity ("Wi-Fi") or other wireless high speed internet or network connection, Bluetooth (such as a low-frequency Bluetooth beacon), coffee machines, refrigerators, freezers, storage areas, taps/fountains for drinks, television, and/or GPS; however other features/accessories not listed herein may also be included. Additionally, the mobile battery powered beverage distribution and marketing cart designs are not limited to the embodiments shown herein, as they may vary in look, size, shape, and accessories based upon each customer's specific requirements.

Figure 1A:
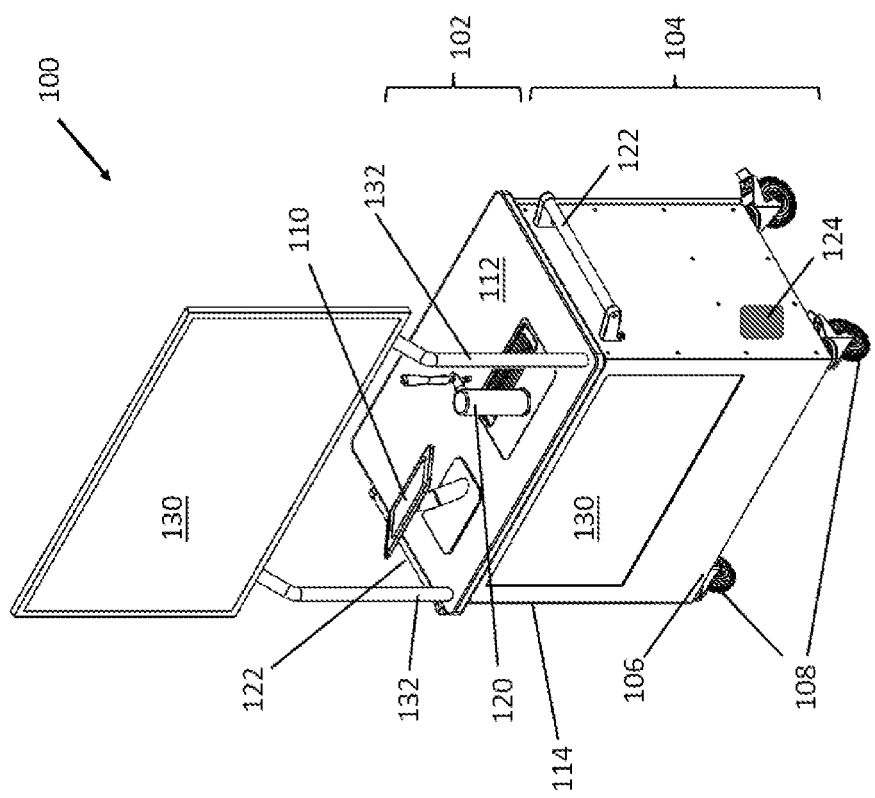
FIG. 1A illustrates a perspective view of a first embodiment of a mobile battery powered beverage distribution cart having a large viewing or marketing screen thereon.

FIGS. 1A and 1B both illustrate a first exemplary embodiment of a beverage distribution cart 100 (shown from different perspectives). FIGS. 2A and 2B both illustrate a second exemplary embodiment of a beverage distribution cart 100 (shown from different perspectives).

In one embodiment, as shown in FIGS. 1A, 1B, 2A, 2B a mobile battery powered beverage cart or kiosk 100 is generally shaped as a wheeled rectangular standing workstation having an upper workstation 102 at a comfortable viewing height, and a wheeled (108) base portion 104 coupled to and/or supported by a lower base frame 106. The wheeled base portion 104 may generally comprise a rectangular metal frame 106 having wheels or casters 108 thereon for rolling transport of the mobile beverage cart/kiosk 100. As shown in FIGS. 1A, 1B, 2A, 2B, one embodiment of a mobile battery powered beverage cart/kiosk 100 may have 3, 4, or more wheels 108 for transport, but any number, size and shape (i.e., round casters) of wheels 108 may be used herein. Additionally, the wheels 108 may also be lockable, retractable, and/or capable of being lockably recessed into or hidden within rectangular metal frame 106 and/or wheeled base portion 104, as an added security feature to prevent unauthorized movement, or theft of, the mobile beverage carts/kiosks 100.

As shown in FIGS. 1A, 1B, 2A, 2B, the wheeled (108) base portion 104 of the mobile battery powered beverage cart 100 may further comprise an upper workstation 102 at a comfortable standing height. The upper workstation 102 may comprise a level work surface area 112 and, at least one, interactive touch screen and/or computer 110 that may be any size and shape and may be disposed on the upper workstation 102 and/or 112. The upper workstation 102 and/or 112 may also comprise any number of beverage distribution fountains 120 mounted thereon. Additionally, the mobile battery powered beverage cart 100, shown in FIGS. 1A, 1B, 2A, 2B, may further comprise a large compartment, such as a storage and/or refrigeration 114 and/or heating compartment, for storing beverages and/or beverage supplies and for keeping the beverages cold and/or warm (as necessary or desired).

In a first embodiment shown in FIGS. 1A and 1B, the mobile battery powered beverage cart 100 may further comprise one or more large viewing screens 130. The large viewing screen 130 may be elevated above the upper workstation 102 via support arm or arms 132, so that it may be easily seen by anyone in the area. The large viewing screen 130 may be used for marketing, advertising, and/or entertainment purposes and may be positioned to attract maximum attention from potential customers. Additionally, the large viewing screen 130 itself may comprise a computer or processor or Wi-Fi, so that it may communicate wirelessly with another electronic device, such as central computer. The embodiment shown in FIGS. 1A and 1B illustrates a single large viewing screen 130, but it should be understood that any number, size, shape, and arrangement of viewing screens 130 may be used. In some embodiments, there may be a combination of several different sized viewing screens, etc.

In a second embodiment shown in FIGS. 2A and 2B, the large viewing screen 130 may be mounted on the wheeled base portion 104. In other embodiments, a mobile battery powered beverage distribution cart 100 may have multiple large viewing screens 130 thereon, in various different positions and/or configurations. For example, the large viewing screens 130 may be placed back to back, or programed to move and/or rotate at particular intervals, etc. In these embodiments, the large viewing screens 130 may be programmed to display the same information, or different information, depending upon the cart's 100 available beverages, location, etc.

As shown in FIGS. 1A, 1B, 2A, 2B, the interactive touch screen and/or computer 110 may generally be coupled to the upper workstation 102 and/or 112. The interactive touch screen and/or computer 110 may be either securely, or removably, mounted to upper workstation 102 and/or 112, while still allowing the screen 110 to be tilted and/or angled for optimal visibility. In some embodiments, the interactive touch screen 110 or computer may be tilted away from the customer, for operation by an employee or barista. In other embodiments, the customers can comfortably operate the interactive touch screen 110 themselves for order selection, such as in the case of a self-serve beverage cart 100. The interactive touch screen 110 itself may comprise a computer 110 and/or be may be operably/electrically coupled to a computer, Wi-Fi, Bluetooth (such as low-frequency, low-powered beacons), and/or GPS (not shown) in order to communicate the information received from the interactive touch screen 110 and/or computer 110 to a central order fulfillment center or central computer. A central order fulfillment center, or central computer, such as a center of operations or a kitchen, for example, may be where additional backup or refill beverage supplies str stored, and called upon, depending upon customer beverage demands.

The mobile battery powered beverage carts 100 herein may be operated by a trained employee (or multiple employees) or may be self-service. In the case of a self-serve mobile battery powered beverage cart/kiosk 100, the interactive touch screen 110 may also run a program that appeals to, or is familiar to, a large variety of users/consumers, such as using lots of simple large sized icons/pictures, for example. Alternatively, the interactive touch screen 110 may be operated by a trained employee/employees to process beverage orders. The interactive touch screen 110 and/or computer may be Wi-Fi or Bluetooth operable to communicate with other computers and/or a central computer, control center, or CPU, for processing credit card payments, and/or for fulfilling the customer orders placed via the beverage carts/kiosks 100. The GPS may be used for security, to track the mobile carts/kiosks 100, and/or to help prevent theft of the carts/kiosks 100 and/or to relocate any carts/kiosks 100 which may have been relocated without authorization. In some embodiments, the carts/kiosks 100 may also include low-powered and/or low-frequency Bluetooth beacons (not shown) for tracking and positioning of the carts/kiosks 100 and to maintain fleet awareness and location.

Additionally, the upper workstation 102 and/or 112 may also optionally include a camera (not shown), credit card/chip reader (not shown), and/or a printer (not shown), and/or a money slot and/or change provider (not shown), and/or a large viewing screen 130 mounted on extension arms 132 and positioned above head-height (or mounted on a side of the wheeled base portion 104), for marketing and/or for viewing of events (such as sporting events, concerts, etc.), as desired, as shown in FIGS. 1A, 1B. Depending upon the needs of each customer, these mobile battery powered carts/kiosks 100 may be customized to include some combination of these accessories. For example, for large sporting events or concerts, the large viewing screen 130 may show a live feed of the sporting event or concert so that customers don't miss any of the event while waiting for a beverage. In another example, some mobile battery powered beverage carts/kiosks 100 may be configured only for credit card/chip use, and won't include a money slot and/or change provider for cash purchases (not shown). In other embodiments, the mobile battery powered beverage carts/kiosks 100 may be configured for use with both cash and credit cards and thus, may include both the credit card reader and money slot and/or change provider (not shown). In these embodiments, the money slot and/or change provider would certainly be securely lockable to prevent theft.

The upper workstation 102 and/or 112 may also comprise (at least one) beverage distribution fountain or dispenser 120 mounted thereon, as well as beverage related supplies, such as cups, lids, additional coffee add-ons (such as stirring sticks, sugar, honey, creams, lemon slices etc.). In the case of coffee making beverage carts/kiosks 100, the carts/kiosks 100 may further comprise coffee and/or espresso machines, beverage warming surfaces, milk steamers, coffee bean grinder, refrigerator, freezer, cooler, mixers, blenders, ice maker/distributor, and other electric dispensers, etc. In the case of a beer or alcohol dispensing beverage carts/kiosks 100, the carts/kiosks 100 may further comprise a kegerator(s), carbonation machine(s), mixers, blenders, ice maker/distributor, etc. The mobile battery powered beverage carts/kiosks 100 may be customized to meet specific customer needs and may be equipped with any number of beverage making machines or supplies.

The mobile battery powered carts/kiosks 100 may also include at least one handle 122 for easily maneuvering, pushing, and/or rolling the mobile battery powered beverage carts/kiosks 100 between locations. The handle 122 may be a folding handle, or a pull-out or pop-out handle, or in other embodiments may be rigid. Regardless, the handle 122 may be used to easily maneuver (i.e. by pushing or pulling) the mobile battery powered beverage carts/kiosks 100 to different locations.

The mobile battery powered beverage carts/kiosks 100 may also include a battery therein. The battery may be positioned inside the wheeled base portion 104 operably coupled to the electronic components (interactive touch screen/computer 110, camera (not shown), credit card reader (not shown) printer (not shown), beverage distribution fountains 120, at least one large viewing screen 130, and any additional equipment such as coffee and/or espresso machines, beverage warming surfaces, milk steamers, coffee bean grinder, refrigerator, freezer, cooler, kegerator(s), carbonation machine(s), mixers, blenders, ice maker/distributor, and other electric dispensers) of the cart 100 to provide power thereto. In some embodiments, some of the electronic components themselves may also comprise their own rechargeable battery, such as the touch screen and/or computer 110, for example.

As best shown in FIG. 1A, the mobile battery powered beverage carts/kiosks 100 may also have a charging port 124 thereon, electrically coupled to a battery (inside wheeled base portion 104 and/or storage or refrigeration compartment 114), for providing power to the battery, such as by plugging the mobile battery powered beverage cart/kiosk 100 into a wall outlet. Charging port 124 may be positioned anywhere on the cart/kiosk 100 and is shown in FIG. 1A only for exemplary purposes of illustration herein. The battery (inside wheeled base portion 104 and/or storage or refrigeration compartment 114) may be a lithium battery, for example, and may be large enough to provide battery power for at least 8 hours and/or the length required by most customers for events, concerts, etc. The battery (inside wheeled base portion 104 and/or storage or refrigeration compartment 114) can be recharged, such as by plugging the cart/kiosk 100 and/or the battery into a wall outlet and/or by replacing or swapping the battery with another fully charged battery. In some embodiments, the mobile battery powered beverage carts/kiosks 100 may be plugged into a wall outlet for charging during use (such as when a wall outlet happens to be conveniently close). Optionally, the carts/kiosks 100 can be charged simultaneously when stored adjacent one together, such as in a daisy chain, for example. Employees can recharge and/or replace batteries on the beverage carts/kiosks 100 between shifts, for example, and battery life is anticipated to be customizable for consumer needs.

The battery (inside wheeled base portion 104 and/or storage or refrigeration compartment 114) may provide electrical power for many or all of the electrical components on the beverage cart/kiosk 100, such as, large viewing screen or television 130 for marketing videos, public relations videos, sports/music/speaker event streaming, streaming sticks (Apple TV, Roku, etc.), lights, speakers, mobile hotspot device, point of sale device(s) such as interactive touch screen and/or computer 110, credit card reader, phone/tablet chargers, and beverage distribution fountain 120.

In some embodiments, the mobile battery powered distribution cart 100 may have a slide out, or removable, battery (inside wheeled base portion 104 and/or storage or refrigeration compartment 114). In this embodiment 100, the battery may be housed within the storage or refrigeration compartment 114 of wheeled base portion 104. In this embodiment, the battery may be accessed by opening the storage or refrigeration compartment 114 to easily slide out the battery for convenient swapping and/or charging of the battery, for example. It should be understood that any part of wheeled base portion 104 may house the battery, or multiple batteries, and may further be lockable or otherwise secured, to prevent theft. If a cart/kiosk 100 needs to be used for a longer time, it may be designed to operate using several batteries, or there may be spare batteries within the cart/kiosk 100 for easy swapping by employees.

Alternatively, the mobile battery powered distribution cart 100 may have a non-removable rechargeable battery (also housed inside wheeled base portion 104 and/or storage compartment 114). In this embodiment 100, the battery may be housed within the storage or refrigeration compartment 114 of wheeled base portion 104. In this embodiment, the battery may be recharged via charging port 124, as shown in FIG. 1A. For example, when the mobile battery powered beverage carts/kiosks 100 are in a storage area or near a wall outlet, the battery may be recharged by electrically coupling the carts/kiosks 100, via charging port 124, with a wall outlet or other power charging unit (not shown), such as via a plug-in cord. The carts/kiosks 100 may also be charged simultaneously when nested or stacked together, in a daisy chain.

In operation, these mobile battery powered beverage carts/kiosks 100 may be rolled out (with the battery(ies) already fully charged) for use at events, concerts, arenas, conferences, or when customer demand is higher. When the event is over, or the customer no longer needs so many point-of-sale beverage carts/kiosks 100, the employees may use the handle 122 to guide or roll the carts/kiosks 100 between locations, such as into a secure storage area for charging and/or resupplying, for example. Once in the storage or charging area, a few employees can manage or maintain a large number of the mobile battery powered beverage carts/kiosks 100, such as by swapping or charging batteries, refilling beverages and supplies, removing and/or refilling change or cash dispensers, and/or performing other maintenance tasks.

In some embodiments, the mobile battery powered beverage carts/kiosks 100 may also be designed to fit together, in nested or stacked configurations, to provide the ability for many mobile battery powered beverage carts/kiosks 100 be stored together in a small amount of space. This compact design profile is ideal for many consumers with limited storage space and/or limited retail space, and also allows for many mobile battery powered beverage carts/kiosks 100 to be rolled out and managed by only a few employees. Furthermore, when the mobile battery powered beverage carts/kiosks 100 are nested or stacked together they may also be electrically coupled together to allow the stack of nested carts 100 to all charge at the same time, with only one being plugged in, such as by daisy chaining.

While various embodiments of devices and systems and methods for using the same have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A mobile battery powered beverage distribution cart, comprising:
   a wheeled base portion having at least one refrigerated compartment therein for storing and refrigerating beverages;
   an upper workstation coupled to the wheeled base portion and having at least one beverage distribution dispenser thereon operatively coupled to the at least one refrigerated compartment for dispensing beverages therefrom;
   at least one large viewing screen for marketing or entertainment, wherein the at least one large viewing screen itself comprises a computer or processor so that it may communicate wirelessly with a central computer, wherein the at least one large viewing screen is elevated above the upper workstation via support arms, and facing out from the cart, so that it may be easily seen by anyone in the area;
   at least one battery secured within the cart and electrically coupled to the at least one refrigerated compartment, or the at least one beverage distribution dispenser, or the at least one large viewing screen, to provide electrical power thereto; and
   wherein the cart is configured to be easily maneuverable by rolling to different locations for beverage distribution.

2. The mobile battery powered beverage distribution cart of claim 1, further comprising an interactive touch screen or computer disposed on the upper workstation of the cart and having Wi-Fi or other wireless communication capability; wherein the interactive touch screen or computer processes beverage orders and payments.

3. The mobile battery powered beverage distribution cart of claim 2, further comprising security features to securely lock the interactive touch screen or computer, the wheeled base portion, the at least one battery, or the at least one refrigerated compartment, to prevent theft or unauthorized tampering.

4. The mobile battery powered beverage distribution cart of claim 2, wherein the interactive touch screen or computer further comprises Wi-Fi, and wherein the interactive touch screen or computer communicates with the central computer, via the Wi-Fi, to provide cart status information.

5. The mobile battery powered beverage distribution cart of claim 4, wherein content of the at least one large viewing screen is programmed by the central computer.

6. The mobile battery powered beverage distribution cart of claim 1, wherein the at least one large viewing screen further comprises its own Wi-Fi.

7. The mobile battery powered beverage distribution cart of claim 1, further comprising at least one of: coffee and/or espresso machines, beverage warming surfaces, milk steamers, coffee bean grinder, refrigerator, freezer, cooler, kegerator(s), carbonation machine(s), mixers, blenders, ice maker/distributor, and other electric dispensers or taps.

8. The mobile battery powered beverage distribution cart of claim 1, further comprising at least one of: GPS, Bluetooth, Wi-Fi, a camera, a printer, a credit card reader, and/or a money slot and/or change dispenser.

9. The mobile battery powered beverage distribution cart of claim 1, wherein the at least one battery provides sufficient electrical power to operate the cart without needing to plug the cart into an electrical wall outlet.

10. The mobile battery powered beverage distribution cart of claim 1, wherein the at least one battery provides enough electrical power to operate the cart without electrically hardwiring, or tethering, the cart to another electrical source.

11. The mobile battery powered beverage distribution cart of claim 1, wherein the at least one battery can be charged when adjacent, and coupled to, a second mobile battery powered beverage distribution cart, via a daisy chain, wherein only the second mobile battery powered beverage distribution cart is plugged in.

12. The mobile battery powered beverage distribution cart of claim 1, further comprising a low-powered, low-frequency Bluetooth beacon for tracking and positioning the cart to maintain cart fleet awareness and location.

13. The mobile battery powered beverage distribution cart of claim 1, wherein the at least one large viewing screen is mounted on a side of the wheeled base portion.

14. The mobile battery powered beverage distribution cart of claim 1, further configured to maintain and optimize performance by monitoring, at least:
beverage supply, beverage quantity remaining, battery power charge level, supply level of beverage accessories, operating efficiency, content of the at least one large viewing screen, status of electrical componentry, malfunctions, employee requests, help needed, supplies needed, financial data, sales data, customer numbers, security, temperature data, and battery charge level of any electrical componentry.

15. A mobile battery powered beverage distribution cart, comprising:
a wheeled base portion having at least one refrigerated compartment therein for storing and refrigerating beverages;
an upper workstation coupled to the wheeled base portion for preparing and dispensing beverages;
at least one large viewing screen for marketing or entertainment disposed on the upper workstation, wherein the at least one large viewing screen itself comprises a screen computer or screen processor so that it may communicate wirelessly with a central computer;
a computer disposed on the upper workstation area for processing beverage orders and payments;
at least one battery secured within the cart and electrically coupled to the at least one refrigerated compartment or the computer, to provide electrical power thereto; and
wherein the mobile battery powered distribution cart is configured to be easily maneuverable by rolling to different locations.

16. The mobile battery powered beverage distribution cart of claim 15, wherein the computer further comprises Wi-Fi, and wherein the computer communicates with the central computer or processor, via the Wi-Fi, to provide cart status information.

17. The mobile battery powered beverage distribution cart of claim 15, further comprising at least one viewing screen having Wi-Fi.

18. A system for maintaining and optimizing performance of mobile battery powered beverage distribution carts, comprising:
at least one mobile battery powered beverage distribution cart, comprising:
a wheeled base portion having at least one refrigerated compartment therein for storing and refrigerating beverages;
an upper workstation coupled to the wheeled base portion for preparing and dispensing beverages;
at least one large viewing screen for marketing or entertainment disposed on the upper workstation, wherein the at least one large viewing screen itself comprises a screen computer or screen processor so that it may communicate wirelessly with a central computer;
a computer disposed on the upper workstation for processing beverage orders and payments;
at least one battery secured within the cart and electrically coupled to the at least one refrigerated compartment or the computer, to provide electrical power thereto; and
wherein the mobile battery powered distribution cart is configured to be easily maneuverable; and
the central computer in wireless communication with the computer on the at least one mobile battery powered beverage distribution cart, wherein the central computer can track status of the at least one mobile battery powered beverage distribution cart to maintain and optimize performance.

19. The system of claim 18, wherein the at least one mobile battery powered beverage distribution cart further comprises GPS or a tracking beacon to communicate location data to the central computer.

20. The system of claim 18, wherein the computer of the at least one mobile battery powered beverage distribution carts communicates wirelessly with the at least one viewing screen to control content of the at least one viewing screen.

* * * * *